(12) United States Patent
Schmitt

(10) Patent No.: US 8,214,321 B2
(45) Date of Patent: Jul. 3, 2012

(54) SYSTEMS AND METHODS FOR DATA PROCESSING

(75) Inventor: Winfried Schmitt, Walldorf (DE)

(73) Assignee: SAP AG, Walldorf (DE)

( * ) Notice: Subject to any disclaimer, the term of this patent is extended or adjusted under 35 U.S.C. 154(b) by 1806 days.

(21) Appl. No.: 10/854,164

(22) Filed: May 27, 2004

(65) Prior Publication Data

US 2005/0027720 A1    Feb. 3, 2005

(30) Foreign Application Priority Data

May 28, 2003   (EP) .................................. 03012034

(51) Int. Cl.
G06F 17/30    (2006.01)

(52) U.S. Cl. ...................................... 707/600; 707/607

(58) Field of Classification Search .................. 707/100
See application file for complete search history.

(56) References Cited

U.S. PATENT DOCUMENTS

| 5,978,788 A | 11/1999 | Castelli et al. ..................... 707/2 |
| 6,418,427 B1 | 7/2002 | Egilsson et al. .................. 707/2 |
| 6,996,569 B1 * | 2/2006 | Bedell et al. .................. 707/100 |
| 2003/0023608 A1 | 1/2003 | Egilsson et al. |

FOREIGN PATENT DOCUMENTS

WO    WO 00/19340    4/2000

OTHER PUBLICATIONS http://www.webopedia.com/TERM/O/OLAP.html.*
http://en.wikipedia.org/wiki/Online_analytical_processing.*
http://www.olapreport.com/fasmi.htm.*

* cited by examiner

Primary Examiner — Syed H Hasan
(74) Attorney, Agent, or Firm — Finnegan, Henderson, Farabow, Garrett & Dunner, LLP

(57) ABSTRACT

Data processing methods and systems are provided. The data processing methods and systems may include providing a set of database tables in a data warehouse, each one of the database tables being assigned to an entity type and storing entities of its entity type, providing at least one application program for processing of classes of database tables, assigning at least one of the database tables to each one of the classes of database tables of the application program, and processing entities stored in the assigned database tables by the application program.

8 Claims, 4 Drawing Sheets

SYSTEMS AND METHODS FOR DATA PROCESSING

BACKGROUND INFORMATION

1. Field of the Invention

The present invention generally relates to computer-implemented databases and data processing systems and methods. More particularly, and without limitation, the invention relates to data warehouse computer systems and online analytical processing (OLAP).

2. Background of the Invention

Online analytical processing (OLAP) is a key part of most data warehouse and business analysis systems. OLAP services provide for fast analysis of multi-dimensional information. For this purpose, OLAP services provide for multi-dimensional access and navigation of data in an intuitive and natural way, providing a global view of data that can be drilled down into particular data of interest. Speed and response time are important attributes of OLAP services that allow users to browse and analyze data online in an efficient manner. Further, OLAP services typically provide analytical tools to rank, aggregate, and calculate lead and lag indicators for the data under analysis.

An OLAP cube is a multi-dimensional representation of a set of data. Such a cube is the basis for transaction data storage in prior art data warehouse systems.

The SAP® business information warehouse is a data warehouse system, which enables users to analyze data from operative SAP applications, as well as other business applications and external data sources such as databases, online services and the Internet. The SAP business information warehouse enables OLAP for processing of information from large amounts of operative and historical data. In this context, OLAP technology enables multi-dimensional analysis from various business perspectives.

The business information warehouse server for core areas and processes, pre-configured with business content, ensures that a user can look at information within the entire enterprise. In selected roles in a company, business content offers the information that employees need to carry out their tasks. As well as roles, business content contains other pre-configured objects such as cubes, queries, key figures and characteristics for simplification of business information warehouse implementation.

With the business explorer, the SAP business information warehouse provides flexible reporting and analysis tools for analysis and decision-making support. These tools include query, reporting and OLAP functions. An employee having access authorization can evaluate past or current data on various levels of detail and from different perspectives, not only on the web but also in Microsoft Excel.

SUMMARY OF THE INVENTION

Systems and methods for data processing consistent with the present invention may enable the processing of database tables of a data warehouse by means of an application program. For example, each database table of a relational database of the data warehouse may have a number of data entries, which are referred to as "entities." The entities of a given database table may have the same entity type, i.e., "account number", "financial statement item", "organizational unit," "partner organization," "version," "time," etc.

In one embodiment, there may be database tables of the entity type "accounts," which contain the account numbers of customers and vendors. Further, database tables of entity type "organizational unit" may contain the legal entities of a company or the organizational units of the company from a business structure perspective.

Consistent with the present invention, at least one application program for processing of classes of the database tables may be provided. Further, a class of database tables may contain database tables having a common entity type. This classification may enable users to perform the same data processing stages by the application program for different database tables provided that the database tables are within the same class.

For a given application program, a sub-set of the database tables may be assigned to the classes for access by the application program to the entities stored in the sub-set of these database tables. In one embodiment, the assignment of database table to classes can be stored in a mapping table.

In accordance with another embodiment, an OLAP component is provided. A user may select from a set of predefined OLAP cubes. The user may need to classify a selected OLAP cube in order to assign the selected OLAP cube to predefined OLAP cube classes. For example, there may be OLAP cube classes for performing different kinds of transactional data processing, such as "investment," "equity," or "goodwill" transactional data processing.

In accordance with a further embodiment, a user may select an application program from a set of application programs. Each one of the application programs of the set of application programs may require database tables of one or more entity type classes and/or one or more OLAP cubes of specific OLAP cube classes. Both the entity type classes and the OLAP cube classes supported by the set of application programs may be predefined.

When a user selects a database table as input data for the selected application, the user may be required to enter the name of a database table in a mapping table in order to assign the database table to one of the predefined entity type classes supported by the selected application. Further, at least one database table may need to be selected and mapped by the user for each entity type class required as input data by the selected application.

The same applies analogously as far as the OLAP cube classes are concerned. For instance, when the user selects one of the OLAP cubes, the selected OLAP cube needs to be mapped to one of the predefined OLAP cube classes. This may be done by entering the name of the given OLAP cube into a mapping table.

In accordance with a further embodiment of the invention, the mapping of database tables to entity type classes may be a n:1 mapping, i.e., between one and n database tables can be mapped to the same entity type class. Database tables, which are mapped to the same entity type class, are merged for processing by the selected application. In contrast, the mapping of OLAP cubes to OLAP cube classes is a 1:1 mapping.

In accordance with yet another embodiment, the OLAP cubes may be loaded from internal or external data sources. Alternatively, the OLAP cubes may be computer generated or user defined.

The various embodiments can include and/or exclude different aspects, features and/or advantages, where applicable. In addition, various embodiments can combine one or more aspects or features of other embodiments, where applicable.

It is to be understood that both the foregoing general description and the following detailed description are exemplary and explanatory only and are not restrictive of the invention, as claimed.

BRIEF DESCRIPTION OF THE DRAWINGS

The following embodiments will be described in greater detail by making reference to the drawings in which.

DETAILED DESCRIPTION

The following detailed description of embodiments of the present invention refers to the accompanying drawings. Where appropriate, the same reference numbers in different drawings refer to the same or similar elements.

Figure 1:
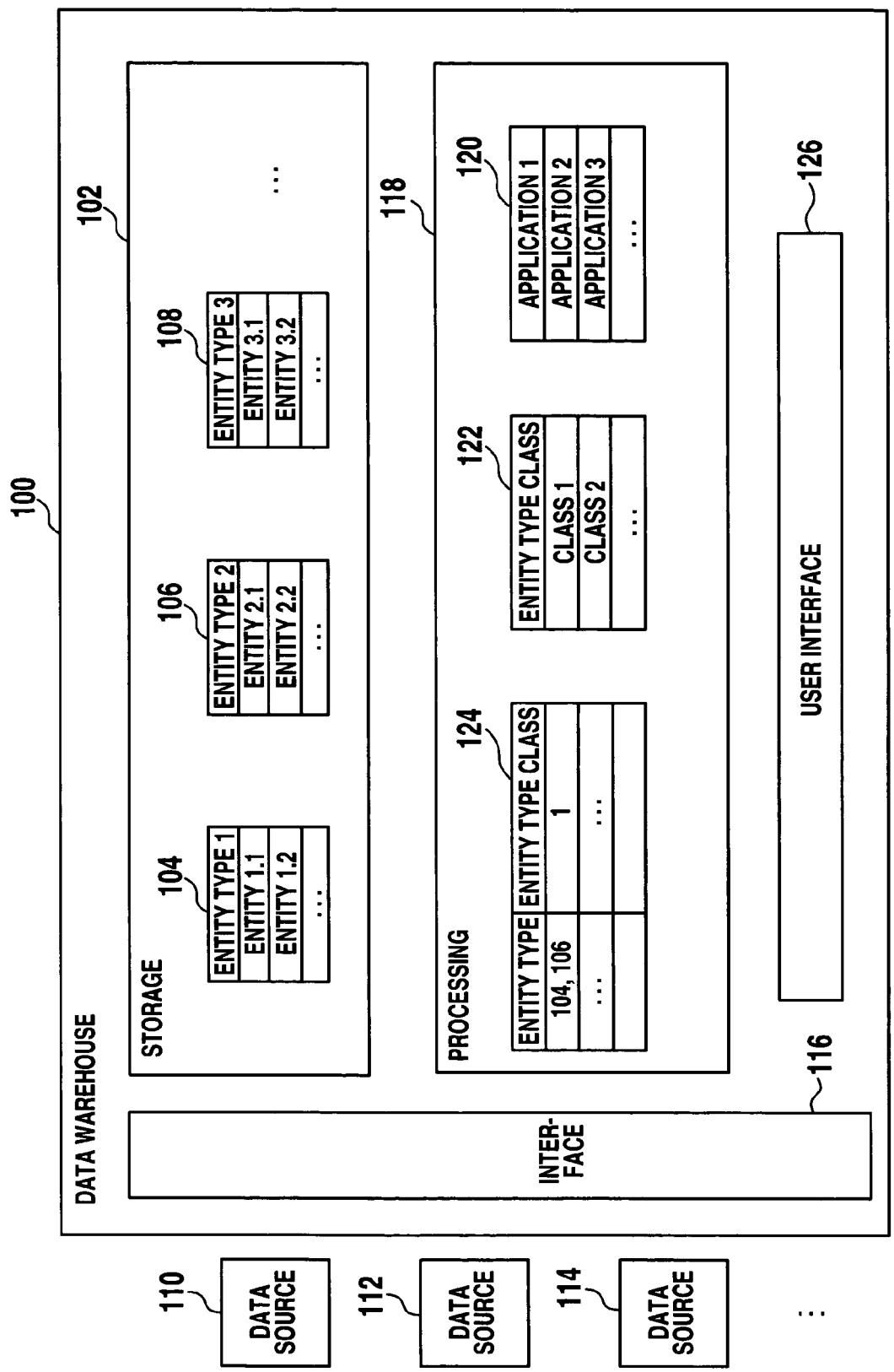
FIG. 1 is a block diagram of an embodiment of a data warehouse computer system consistent with the invention.

FIG. 1 illustrates an exemplary data warehouse computer system 100, consistent with an embodiment of the invention. As shown in FIG. 1, data warehouse computer system 100 may include a storage 102 for storing of a number of database tables 104, 106, 108, etc.

Data from internal or external data sources 110, 112, 114, etc. may be extracted, transformed and loaded into data warehouse computer system 100 via interface 116. The imported data may be stored in the database tables 104, 106, 108, etc. where each database table stores data of the same entity type. A data item of a certain entity type which is stored in one of the database tables 104, 106, 108, etc. may be referred to as "entity".

In the example of FIG. 1, database table 104 stores entities of entity type 1. By way of example, entity type 1 is "account numbers of customers." In this instance, entity 1.1 is the account number of customer A, entity 1.2 is the account number of customer B, etc.

Database table 106 stores data entities which have entity type 2. For example, entity type 2 may be "account numbers of vendors". In such a case, entity 2.1 may be the account number of vendor A, and entity 2.2 may be the account number of vendor B.

Further, in the example of FIG. 1, database table 108 may have entity type 3 "legal entity" and may store the legal entities of a company. In this instance, entity 3.1 is "xy GmbH," entity 3.2 is "xy Ltd," etc.

Processing component 118 of data warehouse computer system 100 may comprise a set of application programs, "application 1", "application 2", "application 3", etc. Each application program of the set of application programs 120 may perform a certain type of business-orientated data processing, such as for the purposes of accounting, book keeping and/or consolidation.

Each one of the application programs of the set of application programs 120 may be designed to process certain classes of database tables. For example, application 1 is designed to process database tables containing account numbers and organizational entities, whereas other application programs of the set of application programs 120 are designed for the processing of other classes of database tables. A definition of the classes of entity types of database tables supported by the set of application programs 120 can be stored in list 122.

In the example of FIG. 1, mapping table 124 may serve to assign one or more of the database tables 104, 106, 108, etc. to classes. These assignments may be entered by, for instance, a user via user interface 126.

In operation, data may be loaded into data warehouse computer system 100 from one or more of the data sources 110, 112, 114, etc. via interface 116 and/or user interface 126 in order to store data entities of various entity types in corresponding ones of database tables 104, 106, 108, etc.

A user may select one of the application programs of the set of application programs 120 via user interface 126. The selected one of the application programs of the set of application programs 120 may require certain classes of database tables as input data.

For example, a user selects "application 1" of the set of application programs 120, which requires database tables of entity type class 1 and entity type class 2 as input data. In order to enable access of the selected application program "application 1" to the required database tables, the user enters the names of one or more of the database tables 104, 106, 108, etc. in mapping table 124 for each required class.

By way of example, entity type 1 and entity type 2 of database tables 104 and 106 can be classified in "class 1." In this instance, the user enters the name of database table 104 and/or the name of database table 106 in the left column of mapping table 124 for assignment to class 1.

It is important to note that the assignment of database tables to classes is a n:1 relationship, i.e., the user may assign one of the database tables 104, 106, 108, etc., which is classified as "class 1" by means of mapping table 124 or he or she may also assign two or more of the database tables falling in class 1 by means of mapping table 124. In the latter case, the database tables that are assigned to the same class may be merged for processing by the selected application program, i.e., "application 1."

Entering of the mapping of database tables to classes may be facilitated by pull down or pop up menus listing the names of the database tables 104, 106, 108, etc., which may be selected by the user for assignment to a certain class.

After the entry of mapping table 124, application 1 may start data processing by accessing of the class 1 and class 2 data tables as specified in mapping table 124.

Figure 2:
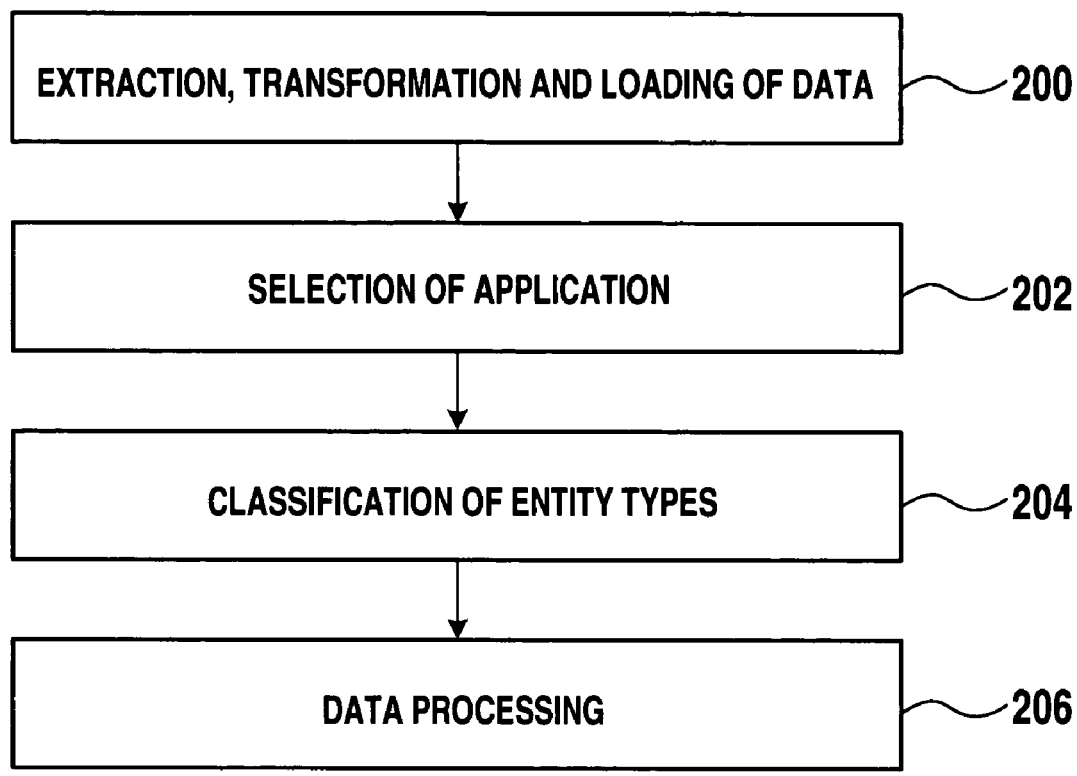
FIG. 2 is illustrative of a flow diagram of an embodiment of a method consistent with the invention.

FIG. 2 illustrates a flow chart of an exemplary method, consistent with an embodiment of the invention. The exemplary method of FIG. 2 may be used in combination with the data warehouse system 100 of FIG. 1.

In stage 200, data is extracted, transformed and loaded from internal or external data sources. In stage 202, a user selects an application program from a set of application programs implemented in the data warehouse computer system. The selected application program requires certain classes of database tables as input data.

Access to the input data is enabled by classification of database tables having certain entity types and selection of one or more of the classified database tables as input data for the selected application program. This is done in stage 204. In stage 206, data processing is performed by the selected application program on the basis of the input data, as specified in the classification and selection stage 204.

Figure 3:
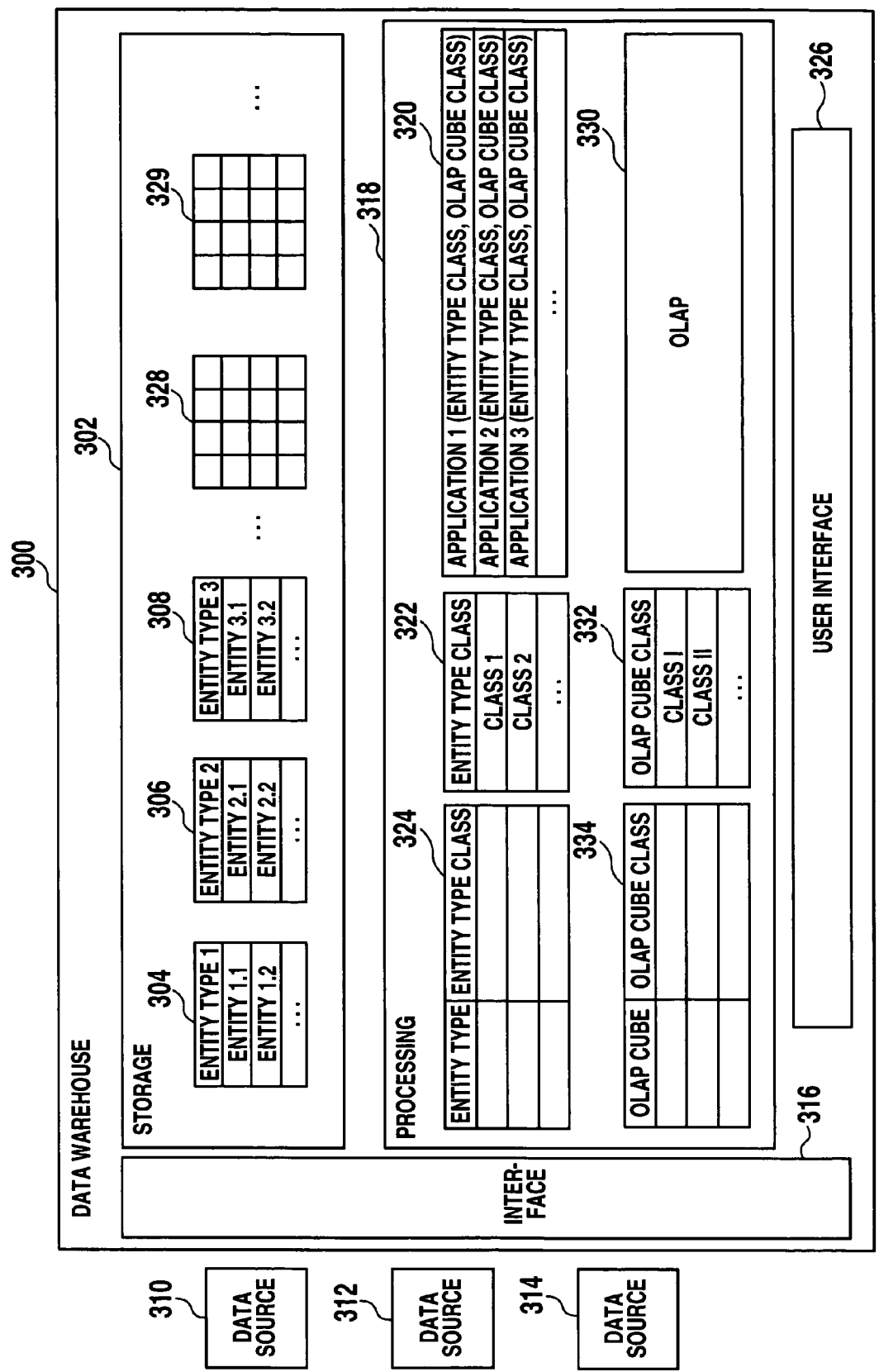
FIG. 3 is a block diagram of another embodiment of a data warehouse computer system consistent with the invention.

FIG. 3 is a block diagram of another exemplary data warehouse system 300, consistent with an embodiment of the invention. Elements in the embodiment of FIG. 3 that correspond to elements of the embodiment of FIG. 1 are designated by like reference numerals having added 200.

In addition to the embodiment of FIG. 1, the data warehouse computer system 300 of FIG. 3 contains a set of OLAP cubes, i.e., OLAP cube 328, OLAP cube 329, etc. The OLAP cubes 328, 329, etc., may be loaded from data sources 310, 312 or 314. Alternatively, the OLAP cubes 328, 329, etc. may be generated by data warehouse computer system 300 or user-defined. Further, data warehouse computer system 300 may include OLAP component 330.

Initially, the OLAP cubes 328, 329, etc. may be empty and specify the layout for transaction data storage for various purposes. For example, OLAP cube 328 may specify a transaction data storage of type "investment," whereas OLAP cube 329 may specify a transaction data storage of type "equity."

The set 320 of application programs may comprise application programs "application 1," "application 2," "application 3," etc. Each one of the application programs may be designed for the processing of database tables of specific ones of the entity type classes given in list 322. Likewise, each one of the application programs of the set of application programs 320 may be designed for performing of database processing stages on data contained in an OLAP cube of a certain class.

The classes of OLAP cubes which are supported by the application programs 320 may be stored in list 332. List 332 contains a description of each one of the OLAP cube classes, i.e., class I, class II, . . . . For example, class I may contain OLAP cubes which are used for financial transactional data storage and processing, whereas OLAP cube class II may contain OLAP cubes which are used for real estate type transactional data storage and processing.

Mapping table 334 serves to map user selected ones of the OLAP cubes 328, 329, etc. to OLAP cube classes I, II, etc.

In operation, the user selects one of the application programs of the set of application programs 320 via user interface 326. The selected one of the application programs 320 requires database tables of certain entity type classes and at least one OLAP cube of a certain OLAP cube class. Via user interface 326, the user may be prompted to specify the mapping of database tables to the required entity type classes and the mapping of OLAP cubes to the required OLAP cube class.

For example, if the user has selected "application 1" from the set of application programs 320, application 1 may require database tables of entity type class 1 and 2 and OLAP cube class I.

Next, the user selects database tables from storage 302 for assignment to the required entity type classes 1 or 2. This may be facilitated by pull down menus containing a list of the names of the available database tables 304, 306, 308, etc.

Likewise, the user may be prompted to select one of the OLAP cubes 328, 329, etc. for classification and mapping to the required class I. This mapping may be entered in mapping table 334, which relates the user selected OLAP cube of the OLAP cubes 328, 329, etc. to the required OLAP cube class, which is class I in the example considered here.

When the selected one of the application program 320 is started the input data is accessed in storage 302 by means of mapping table 324. Further, the selected one of the application programs 320 may invoke OLAP component 330 to generate transaction data for the OLAP cube as specified by the user in mapping table 334.

For example, if the user has selected OLAP cube 328 and classified this OLAP cube 328 as class I, this mapping is retrieved by the selected one of the application programs, i.e., application 1 from mapping table 334. By means of OLAP component 330, transaction data may be stored in the OLAP cube 328 on the basis of the input data. In addition, the selected one of the application programs may perform certain data processing stages on the transactional data stored in the selected one of the OLAP cubes. Hence, the result of the data processing of the selected one of the applications is outputted and stored in the transaction data storage provided by the selected one of the OLAP cubes within storage 302.

Accordingly, the selection of database tables as input parameters and the selection of OLAP cubes is simplified and is made more user friendly. Further, this may enable non-expert users to perform complex transactional data processing and to integrate expert knowledge in the class definitions.

Figure 4:
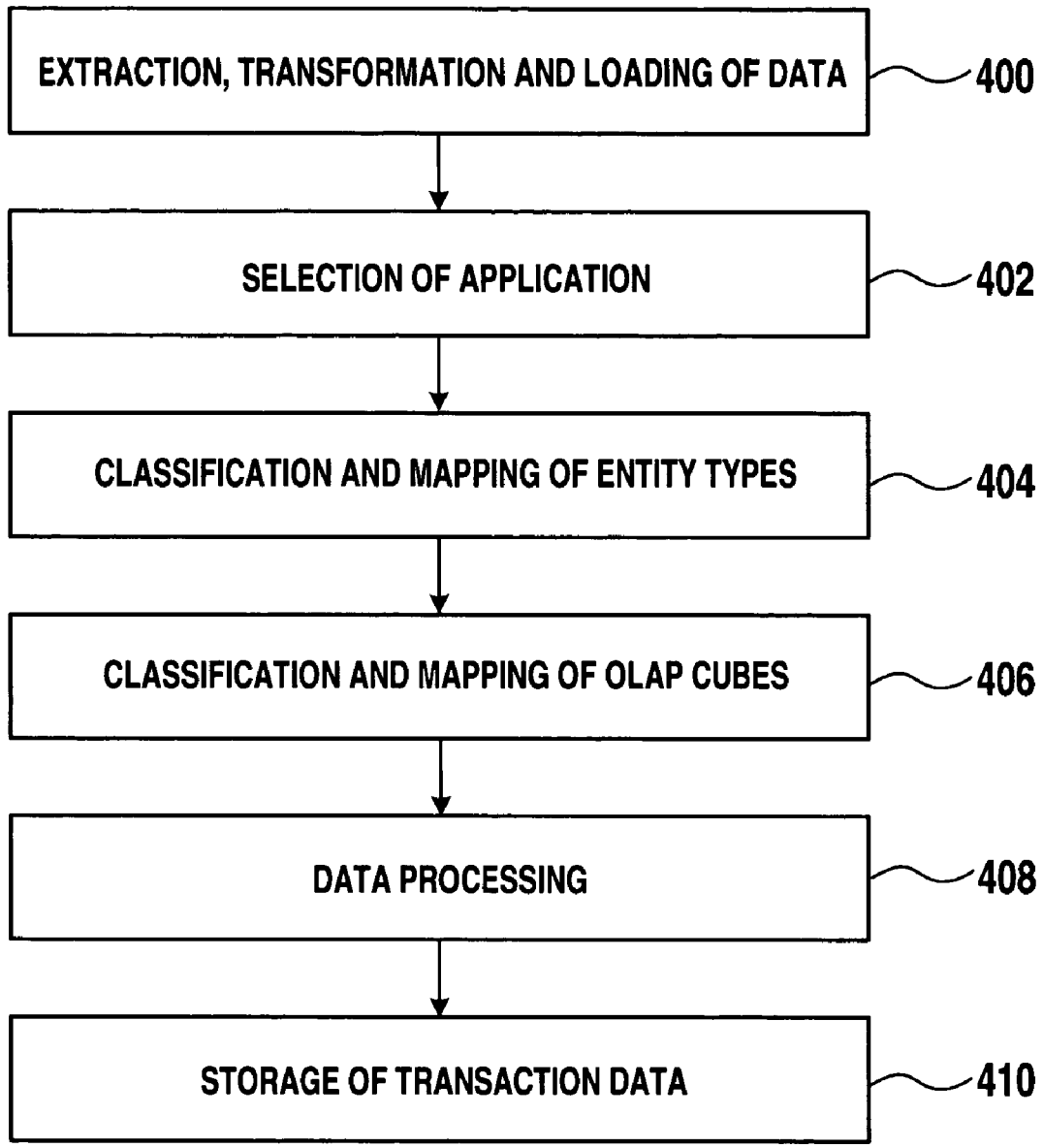
FIG. 4 is illustrative of another embodiment of a method consistent with the invention.

FIG. 4 is a flow diagram of an exemplary method, consistent with an embodiment of the invention. The exemplary method of FIG. 4 may be used in combination with a data warehouse system, such as that presented in FIG. 3.

In stage 400, data is extracted, transformed and loaded from internal and/or external data sources. In stage 402, a user selects one of the application programs supported by data warehouse computer system. The selected one of the application programs requires certain classes of database tables and at least a certain class of OLAP cube as input data and input parameters, respectively. In stage 404, database tables having certain entity types are assigned to the required classes by a user. This assignment of database tables to required classes may be stored as a mapping table.

In stage 406, an OLAP cube is selected by a user and classified in the required OLAP cube class. The corresponding mapping may be stored as a further mapping table.

Now the selected one of the application programs can start data processing. In stage 408, the selected application program invokes an OLAP component in order to fill the selected OLAP cube with transactional data. This may be performed on the basis of the input data provided by the selected database tables. The transactional data contained in the OLAP cube may be further processed by the selected one of the application programs. The result of the data processing operation may be stored as transactional data in the OLAP cube. In stage 410, the transactional data may be visualized on the user interface and stored for later reference.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, CD-ROM, or other forms of RAM or ROM.

Accordingly, other embodiments of the invention will be apparent to those skilled in the art from consideration of the specification and practice of the invention disclosed herein. It is therefore intended that the specification and examples be considered as exemplary only, with a true scope and spirit of the invention being indicated by the following claims.

What is claimed is:

1. A data processing method comprising:
   providing a set of database tables in a data warehouse, each database table being assigned to an entity type and storing entities of its entity type;
   providing a set of online analytical processing cubes in a data warehouse, each online analytical processing cube specifying a layout for transactional data storage;
   providing at least one application program for processing at least one class of database tables and at least one class of online analytical processing cubes;
   mapping a sub-set of the set of database tables to the at least one class of database tables, the sub-set of database tables comprising database tables of one or more entity types;
   mapping a sub-set of the set of online analytical processing cubes to the at least one class of online analytical processing cubes;
   invoking an online analytical processing component to fill the online analytical processing cubes with transactional data;
   processing the entities stored in the sub-set of database tables and the transactional data stored in the sub-set of online analytical processing cubes by the application program; and
   providing analysis of the entities and the transactional data processed by the application program to a user.

2. The method of claim 1, comprising providing a set of application programs, whereby each application program of the set of application programs is adapted to process a set of classes of database tables and online analytical processing cubes.

3. The method of claim 1, further comprising storing multi-dimensional transactional data resulting from the data processing.

4. A data processing system comprising:
   a relational database of a data warehouse for storing a set of database tables, each database table being assigned to an entity type and storing entities of its entity type;
   a relational database of a data warehouse for storing a set of online analytical processing cubes, each online analytical processing cube specifying a layout for transactional data storage;
   at least one application program for processing at least one class of database tables and at least one class of online analytical processing cubes;
   a mapping table for mapping a sub-set of the set of database tables to the at least one class of database tables, the sub-set of database tables comprising database tables of one or more entity types;
   a mapping table for mapping a sub-set of the set of online analytical processing cubes to the at least one class of online analytical processing cubes;
   means for invoking an online analytical processing component to fill the online analytical processing cubes with transactional data;
   means for processing the entities stored in the sub-set of database tables and the transactional data stored in the sub-set of online analytical processing cubes with the application program; and
   means for providing analysis of the entities and the transactional data processed by the application program to a user.

5. The data processing system of claim 4, further comprising user interface means for entering the mapping table.

6. A computer program product, stored in a digital storage medium, comprising program means for:
   providing a set of database tables in a data warehouse, each database table being assigned to an entity type and storing entities of its entity type;
   providing a set of online analytical processing cubes in a data warehouse, each online analytical processing cube specifying a layout for transactional data storage;
   providing at least one application program for processing at least one class of database tables and at least one class of online analytical processing cubes;
   mapping a sub-set of the set of database tables to the at least one class of database tables, the sub-set of database tables comprising database tables of one or more entity types;
   mapping a sub-set of the set of online analytical processing cubes to the at least one class of online analytical processing cubes;
   invoking an online analytical processing component to fill the online analytical processing cubes with transactional data;
   processing the entities stored in the sub-set of database tables and the transactional data stored in the sub-set of online analytical processing cubes by the application program; and
   providing analysis of the entities and the transactional data processed by the application program to a user.

7. The computer program product of claim 6, the online analytical processing cube being identified by a second mapping table.

8. The computer program product of claim 6, further comprising storage of transactional data as a result of the data processing.

* * * * *